(12) United States Patent
Bickham (10) Patent No.: US 7,099,544 B2
(45) Date of Patent: *Aug. 29, 2006

(54) HIGH SBS THRESHOLD NZDS OPTICAL FIBER

(75) Inventor: Scott R. Bickham, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/996,514

(22) Filed: Nov. 24, 2004

(65) Prior Publication Data

US 2005/0135760 A1   Jun. 23, 2005

Related U.S. Application Data

(60) Provisional application No. 60/531,140, filed on Dec. 19, 2003.

(51) Int. Cl.
G02B 6/02   (2006.01)
(52) U.S. Cl. ....................... 385/123; 385/126
(58) Field of Classification Search ................. 385/24, 385/100, 122–128, 147, 16
See application file for complete search history.

(56) References Cited

U.S. PATENT DOCUMENTS

| | | | |
|---|---|---|---|
| 5,170,457 A | 12/1992 | Jen | 385/123 |
| 5,568,583 A | 10/1996 | Akasaka et al. | 385/123 |
| 5,848,215 A | 12/1998 | Akasaka et al. | 385/123 |
| 5,851,259 A | 12/1998 | Clayton et al. | 65/377 |
| 6,587,623 B1 | 7/2003 | Papen et al. | 385/123 |
| 2002/0118935 A1 | 8/2002 | Balestra et al. | 385/123 |
| 2002/0164139 A1* | 11/2002 | Saitou et al. | 385/127 |
| 2003/0180019 A1* | 9/2003 | Tirloni | 385/127 |

FOREIGN PATENT DOCUMENTS

| | | |
|---|---|---|
| EP | 1 241 810 | 9/2002 |
| WO | WO 01/65287 | 9/2001 |

OTHER PUBLICATIONS

Shibata et al, "A consideration on single mode fibers for frequency division multiplexing transmission system" by IEEE publication, dated 1989 pp. 0021-0026.*

Shibata N, et al. "*A consideration on single-mode fibers for frequency-division-multiplexing transmission systems*", Communications Technology For The 90s and Beyond Proceedings of Globecom, Nov. 27, 1989, pp. 21-26.

* cited by examiner

*Primary Examiner*—Akm Enayet Ullah
(74) *Attorney, Agent, or Firm*—Joseph M. Homa (57) ABSTRACT

A non-zero dispersion shifted optical waveguide fiber having a high threshold for stimulated Brillouin scattering is disclosed.

14 Claims, 4 Drawing Sheets

HIGH SBS THRESHOLD NZDS OPTICAL FIBER

BACKGROUND OF THE INVENTION

This application claims the benefit of priority under 35 U.S.C. § 119(e) of U.S. Provisional Application Ser. No. 60/531,140 filed on Dec. 19, 2003.

1. Field of the Invention

The present invention relates to high SBS threshold optical fibers. More preferably, the present invention relates to high SBS threshold non-zero dispersion shifted optical fibers, or NZDS fibers, or NZ-DSF's.

2. Technical Background

Stimulated Brillouin Scattering (SBS) is a dominant non-linear penalty in many optical transmission systems. In many systems, the launching of large power to optical fiber while maintaining high signal to noise ratio (SNR) is desirable. However, as the launch power or signal power of an incident signal launched into an optical fiber increases, the launch power may exceed a certain threshold power and part of the signal power gets reflected due to SBS as a reflected signal. An undesirably large amount of the signal power can thus be reflected back toward the transmitter due to SBS. In addition, the scattering process increases the noise level at the signal wavelength. The combination of decrease in signal power and increase in the noise both lower the SNR and lead to performance degradation.

At finite temperatures, thermal excitations occur in glasses similar to phonons in crystals, and the interaction of these vibrational modes with low intensity signal light produces spontaneous Brillouin scattering. An intense optical field generates pressure or sound waves through electrostriction due to the beating of intense incident and spontaneous reflected light giving rise to pressure or acoustic waves. The change in pressure causes material density to change, thereby resulting in refractive index fluctuations. The net result is that an intense electrical field component of the optical wave generates pressure or sound waves which cause density fluctuations. The acoustic wave changes the refractive index and enhances the reflected light amplitude through Bragg diffraction. Above the SBS threshold of an optical fiber, the number of stimulated photons is very high, resulting in a strong reflected field which limits the optical power that is transmitted and which reduces the SNR.

SUMMARY OF THE INVENTION

Disclosed herein is non-dispersion shifted optical fiber (NZDSF fiber) having a high SBS threshold. The optical fiber guides at least one optical mode and a plurality of acoustical modes, including an $L_{01}$ acoustical mode and an $L_{02}$ acoustical mode.

The optical fiber comprises a core having a refractive index profile and a centerline and a cladding layer surrounding and directly adjacent the core. The core comprises a plurality of segments, preferably three segments that include a central segment, a moat segment, and a ring segment. Preferably, the core comprises a maximum relative refractive index greater than 0.75%.

The refractive index of the core is selected to provide an optical effective area at 1550 nm greater than 80 $\mu m^2$; a dispersion at 1550 nm having an absolute magnitude greater than 10 ps/nm-km; and an absolute SBS threshold (in dBm) greater than about $10+10 \log [(1-e^{-(0.19)(50)/4.343})/(1-e^{-(\alpha)(L)/4.343})]$ dBm for a given fiber length, L in km, and a given attenuation, $\alpha$ in dB/km, of the optical fiber, as determined using a continuous wave light source, preferably having a spectral width of less than about 150 kHz, wherein the log is understood to be a base 10 logarithm. Preferably, the optical fiber has a zero dispersion at a wavelength less than 1450 nm, In preferred embodiments, the zero dispersion is less than 1400 nm. Preferably, the attenuation at 1550 nm is less than 0.23 dB/km, more preferably less than 0.21 dB/km. Embodiments having an absolute SBS threshold greater than about $11+10 \log [(1-e^{-(0.19)(50)/4.343})/(1-e^{-(\alpha)(L)/4.343})]$ dBm, as well as embodiments greater than about $12+10 \log [(1-e^{-(0.19)(50)/4.343})/(1-e^{-(\alpha)(L)/4.343})]$ dBm, are also disclosed herein. Preferably, the acousto-optic effective area, $AOEA_{L01}$, of the $L_{01}$ acoustical mode is not less than 200 $\mu m^2$ at the Brillouin frequency of the optical fiber. Preferably, the acousto-optic effective area, $AOEA_{L02}$, of the $L_{02}$ acoustical mode is not less than 200 $\mu m^2$ at the Brillouin frequency of the optical fiber. More preferably, both $AOEA_{L01}$ and $AOEA_{L02}$ are not less than 200 $\mu m^2$ at the Brillouin frequency of the optical fiber.

In preferred embodiments, the optical effective area is between 80 and 120 $\mu m^2$. In other preferred embodiments, the optical effective area is between 90 and 110 $\mu m^2$. In one set of preferred embodiments, optical fiber is disclosed having a core having a refractive index profile and a centerline, and having a cladding layer surrounding and directly adjacent the core, wherein the refractive index of the core is selected to provide an optical effective area at 1550 nm greater than 80 $\mu m^2$, a zero dispersion less than 1500 nm; and an absolute SBS threshold in dBm greater than about $10+10 \log [(1-e^{-(0.19)(50)/4.343})/(1-e^{-(\alpha)(L)/4.343})]$, wherein L is the length in km and a is the attenuation at 1550 nm.

Reference will now be made in detail to the present preferred embodiments of the invention, examples of which are illustrated in the accompanying drawings.

DETAILED DESCRIPTION OF THE PREFERRED EMBODIMENT

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

Effective area is defined as [G. P. Agrawal, Nonlinear Fiber Optics, 3d edition, Academic Press, 2001, p. 44]

$$A_{eff} = \frac{2\pi \left( \int\int f_o^2 r dr \right)^2}{\int\int f_o^4 r dr},$$

where the integration limits are 0 to $\infty$ for the radial direction r, and $f_o$ is the optical field associated with light propagated in the waveguide. As used herein, "effective area" or "$A_{eff}$" refers to optical effective area at a wavelength of 1550 nm unless otherwise noted.

The term "$\alpha$-profile" refers to a relative refractive index profile, expressed in terms of $\Delta(r)$ which is in units of "%", where r is radius, which follows the equation, $\Delta(r) = \Delta(r_o)(1 - [|r - r_o|/(r_1 - r_o)]^\alpha),$ where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, $2w = MFD$, and $w^2 = (2\int f_o^2 r \, dr / \int [df_o/dr]^2 r \, dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode.

Kappa is the ratio of dispersion divided by dispersion slope at a particular wavelength. Unless otherwise noted herein, kappa is reported at a wavelength of 1550 nm.

A waveguide fiber telecommunications link, or simply a link, is made up of a transmitter of light signals, a receiver of light signals, and a length of waveguide fiber or fibers having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

When an optical wave propagates in an optical waveguide in which acoustic modes are present, the frequency of the scattered light is determined by phase and wave-vector matching conditions:

where $E_1$ and $E_2$ are electrical fields of the incident and reflected optical waves, respectively, $\omega_1$ and $\omega_2$ are the respective frequencies, $\kappa_1$ and $\kappa_2$ are the respective optic wave vectors, $\rho$ is material density, $\Omega$ is acoustic frequency, and $q$ is acoustic wave vector.

The phase matching conditions are:

$\omega_1 = \omega_2 + \Omega$ $q = \kappa_1 - \kappa_2$ $|q| = \kappa_1 + \kappa_2 \approx 2\kappa_1$ The Brillouin frequency is:

$\Omega = |q|v$ $\Omega = 2nv\omega_1/c$

The Brillouin frequency for bulk silica is around 11 GHz and v is velocity of sound.

The optical fields that contribute to the Brillouin scattering are:

incident field: $E_1(z,t) = K_o f_o(r,\theta) A_1(z,t) \exp[i(\kappa_1 z - \omega_1 t)] + c.c.$ reflected field: $E_2(z,t) = K_o f_o(r,\theta) A_2(z,t) \exp[i(\kappa_2 z - \omega_2 t)] + c.c.$ where $f_o(r, \theta)$ is the amplitude of the optical field at radius r and azimuthal angle $\theta$, $K_o = [\int\int f_o^2(r,\theta) r dr d\theta]^{-1/2}$ is the normalization factor, and "c.c." denotes the complex conjugate of the first term.

The material density $\tilde{\rho}$ obeys the acoustic wave equation [R. W. Boyd, Nonlinear Optics, 2nd edition, Academic Press 2003, p. 418]:

$$\frac{\partial^2 \tilde{\rho}}{\partial t^2} - \Gamma' \nabla^2 \frac{\partial \tilde{\rho}}{\partial t} - v^2(r) \nabla^2 \tilde{\rho} = -\frac{\gamma_e \nabla^2 \langle E^2 \rangle}{8\pi}$$

where $\nabla^2$ is the Laplacian operator, $\Gamma'$ is the damping parameter, $\gamma_e$ is the electrostrictive constant, v is the velocity of sound, and $E = E_1 + E_2$.

The material density change can be represented as:

$$\tilde{\rho}(r, \theta, t, z) = \rho_0 + \sum_n a_n(z, t) f_a^{(n)}(r, \theta) \exp[i(q_n z - \Omega_n t)] + c.c.$$

where $\rho_0$ is the material density of silica. $f_a^{(n)}(r,\theta)$ is the transverse profile of the acoustic mode, which is the nth solution of the equation:

$$\nabla_\perp^2 - \left(\frac{\Omega^2}{v^2(r)} - q^2\right) \rho(r, \theta) = 0,$$

where $q_n$ and $\Omega_n$ are the wave number and the acoustic frequency of the nth acoustic mode, respectively, and the coefficient $\alpha_n(z,t)$ describes the spatial and temporal evolution of the nth acoustic mode.

The dependence of sound velocity on the transverse coordinate in the fiber v(r) is determined by the corresponding index profile $\Delta(r)$. The modal equation can be numerically solved by including the radial variation of the material density and longitudinal sound velocity across the refractive index profile:

$v(r) = 5944[1 - 0.12 * \Delta(r)][m/s]$ where numerical parameters in above equation were initially taken from N. Lagakos, J. A. Bucaro, and R. Hughes, Applied Optics, vol. 19, pp. 3668–3670 (1980) and adjusted to match the peaks in the measured Brillouin gain spectrum of LEAF optical fiber manufactured by Corning Incorporated [C. C. Lee and S. Chi, "Repeaterless Transmission of 80-Channel AM-SCM Signals over 100 km Large effective area dispersion-shifted fiber," IEEE Photonics Technology Lett. vol. 12, pp. 341–343 (February 2000)].

The above expansion can be substituted in the acoustic wave equation and the orthogonality condition used to obtain:

$$a_n \sim \frac{\int\int f_o^2 f_a^{(n)} r dr d\theta}{\int\int f_o^2 r dr d\theta \int\int (f_a^{(n)})^2 r dr d\theta},$$

where the proportionality refers to the stationary coefficient of $a_n(z,t)$. Strictly speaking, the set of acoustic modes is complete but not orthogonal [see E. Peral and A. Yariv, IEEE J. Quantum Electronics, vol. 35, pp. 1185–1195 (1999)], but the assumption of orthogonality is supported by the good agreement between the predicted and measured SBS thresholds of the optical fibers disclosed herein.

The refractive index change caused by the acoustic field is proportional to the density change [R. W. Boyd, Nonlinear Optics, 2nd edition, Academic Press 2003, p. 404], i.e. $\Delta n \sim \rho - \rho_0$. Therefore $$\Delta n \sim \frac{\iint f_o^2 f_a^{(n)} r dr d\theta}{\iint f_o^2 r dr d\theta \iint (f_a^{(n)})^2 r dr d\theta} f_a^{(n)}.$$

From the standard perturbation theory, the change in the propagation constant is [G. P. Agrawal, Nonlinear Fiber Optics, 3d edition, Academic Press, 2001, p. 43]:

$$\Delta \beta \sim \frac{\iint \Delta n f_o^2 r dr d\theta}{\iint f_o^2 r dr d\theta}$$

Then in analogy to the optical effective area, the acousto-optic effective area (AOEA) is introduced which depends on the overlap between the optical mode and the nth acoustic mode:

$$A_{eff}^{a-o,(n)} = \left[\frac{\iint f_o^2 r dr d\theta}{\iint f_o^2 f_a^{(n)} r dr d\theta}\right]^2 \iint (f_a^{(n)})^2 r dr d\theta$$

Since the imaginary part of $\Delta\beta$ represents the Brillouin gain, it is inversely proportional to the AOEA. Therefore, a small overlap between optical and acoustic fields leads to a large acousto-optic effective area and consequently small Brillouin gain for the respective acoustic mode.

For input signal at 1550 nm, values of the acousto-optic effective area of the optical fiber are calculated for the respective acoustic mode.

We have designed waveguides with robust optical properties and large acousto-optic effective areas. Measurements of a large number of fabricated optical fibers have verified the connection between acousto-optic effective area and the SBS gain factor.

An optical waveguide fiber which is optically single-moded at a particular wavelength may be multi-moded acoustically at the same optical wavelength because the acoustic wavelength corresponding to Brillouin frequency is of the order of 0.55 microns, which is quite small compared to typical optical waveguide fiber dimensions. In the case of spontaneous Brillouin scattering at relatively low launch powers, the incident optical field is Brillouin scattered by each of the acoustic modes and Brillouin gain spectrum shows peaks corresponding to optical field interaction with each of the acoustic modes. At relatively high launch powers, the SBS threshold is exceeded, and one of the acoustic modes typically becomes dominant while the other acoustic modes do not survive the mode competition, leading to the onset of stimulated Brillouin scattering.

As coupling between the optical mode field and the acoustic mode field(s) increases, more optical power is undesirably reflected opposite to the direction of optical signal transmission.

As disclosed herein, the coupling between the optical and acoustical modes is preferably reduced via the refractive index profiles of the optical fiber disclosed herein. Preferably, the optical mode field remains extended while acoustical fields become more tightly confined to reduce overlap between the optical mode field and the acoustical fields.

The optical fiber disclosed herein tends to pull the mode field of the dominant acoustic mode field (typically $L_{01}$) in toward the centerline of the optical fiber, resulting in reduced coupling between the acoustic and optical fields. The optical fiber disclosed herein also preferably tends to pull the mode field of the next dominant acoustic mode field (typically $L_{02}$) in toward the centerline of the optical fiber, resulting in reduced coupling between this next dominant acoustic mode field and the optical field.

Generally, the acoustic field in an optical fiber is more localized (typically much more localized) near the centerline of the fiber compared to the optical field. Accordingly, the behavior of the acoustic field is greatly affected in the central portion of the core of the optical fiber, for example by density variations in the central 2 micron radial region of the optical fiber and consequently within the refractive index profile of the core of the fiber.

We have found that, in order to achieve high SBS threshold optical fiber, the minimum acousto-optic area of the optical fiber should be as large as possible. In various embodiments, we have also found that the acousto-optic area of the dominant acoustic mode (typically $L_{01}$) and the acousto-optic area of the second most dominant acoustic mode (typically $L_{02}$) generally should be as close to one another in magnitude as possible. Without being limited by any particular theory, the relative closeness in value of the acousto-optic areas of these two modes appears to allow division of the optical-acoustic coupling between the two acoustic modes, thereby reducing coupling overall synergistically in a manner not possible by simply having one acousto-optic area which is very large in magnitude while the other acousto-optic area is much smaller than the very large acousto-optic area. Also, the optical field may couple to more than two acoustic modes, thereby providing additional paths for the dissipation of the reflected signal.

The Brillouin frequency for optical fiber as disclosed herein is preferably between about 10 to 12 GHz.

The optical fiber disclosed herein comprises a core and a cladding layer (or cladding) surrounding and directly adjacent the core. The cladding has a refractive index profile, $\Delta_{CLAD}(r)$. Preferably, $\Delta_{CLAD}(r)=0$ throughout the cladding. The core comprises a refractive index profile, $\Delta_{CORE}(r)$. The core has a maximum relative refractive index, $\Delta_{MAX}$, in %, occurring at a radius $r_{\Delta MAX}$. In preferred embodiments, the core is comprised of a plurality of core portions, each having respective refractive index profiles, for example $\Delta_{CORE1}(r)$, $\Delta_{CORE2}(r)$, and so on. Each core portion may have a maximum relative refractive index for that core portion, i.e. a local maximum, reported in %, for example $\Delta_{1MAX}$ for a first core portion, $\Delta_{2MAX}$ for a second portion, and so on. Likewise, a core portion may have a minimum relative refractive index, such as $\Delta_{2MIN}$, etc. A maximum or minimum relative refractive index may occur at a particular radius, such as $r_{\Delta 1MIN2}$ or $r_{\Delta 2MIN}$ and so on. For the embodiments disclosed herein, the core is defined herein to end at a radius rcoRE.

We have found that a higher dopant concentration at or near the optical fiber centerline, and in particular in a central portion of the core of the optical fiber, forces the acoustic modes to be more tightly confined.

Preferably, the core is comprised of silica doped with germanium, i.e. germania doped silica. Doping of the core, and in particular the central portion of the core, advantageously reduces sound velocity in the optical fiber core relative to its cladding, resulting in total internal reflection of the acoustic field. Dopants other than germanium, singly or in combination, may be employed within the core, and particularly at or near the centerline, of the optical fiber disclosed herein to obtain the desired refractive index and density. Although high refractive index values (or high levels of updopant) tend to bring the acoustical mode field toward the centerline, such values also tend to decrease the optical effective area. In preferred embodiments, the core of the optical fiber disclosed herein has a non-negative refractive index profile, more preferably a positive refractive index profile, wherein the core is surrounded by and directly adjacent to a cladding layer.

Preferably, the refractive index profile of the optical fiber disclosed herein is non-negative from the centerline to the outer radius of the core, RCORE In preferred embodiments, the optical fiber contains no index-decreasing dopants in the core.

1$^{st}$ Set of Preferred Embodiments

Figure 1:
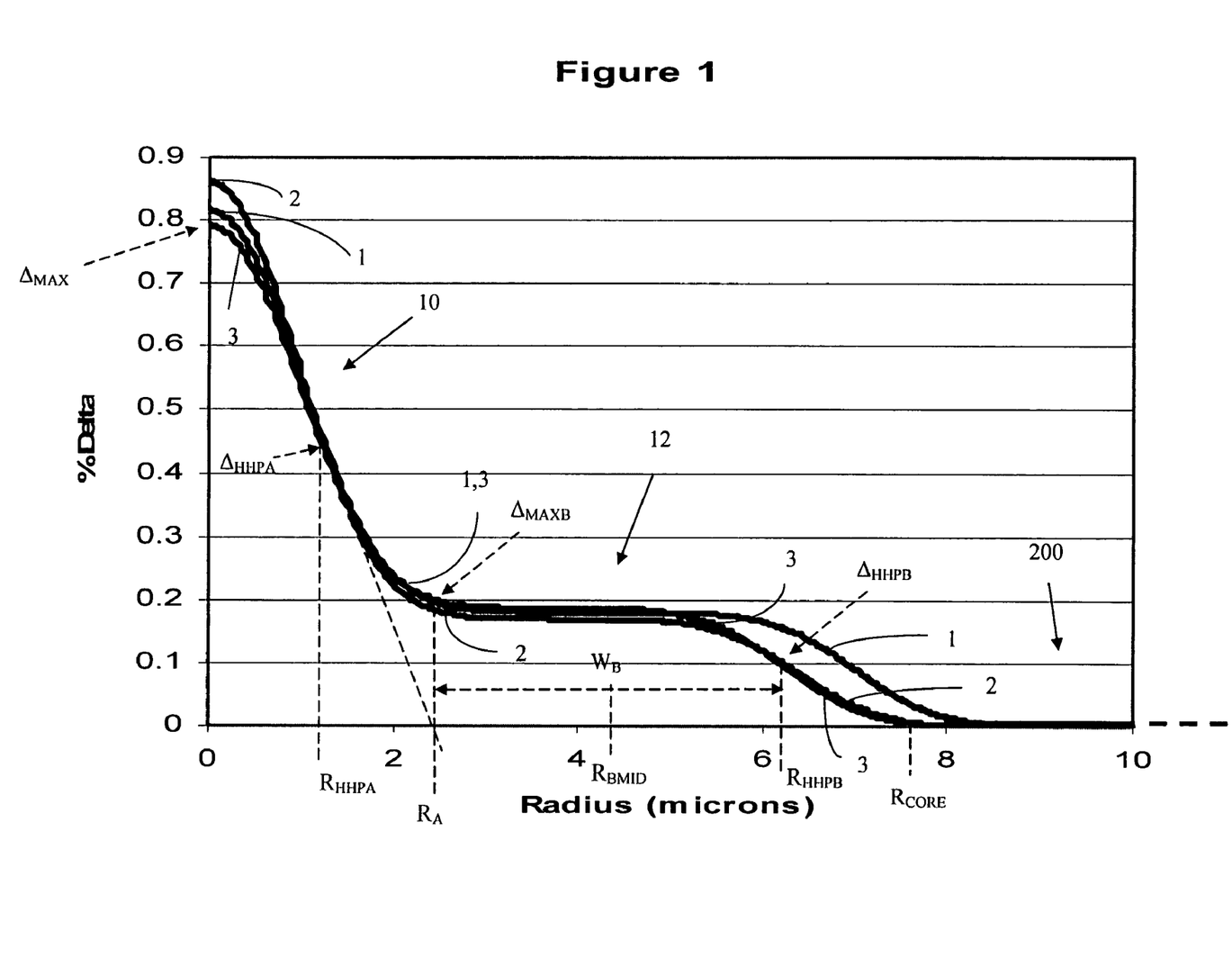
FIG. 1 shows refractive index profiles corresponding to a first set of preferred embodiments of an optical waveguide fiber as disclosed herein.

Table 1 lists an illustrative first set of preferred embodiments, Examples 1–3. FIG. 1 shows the corresponding refractive index profiles of Examples 1–3 in curves 1–3, respectively.

TABLE 1

| | | Example: | | |
|---|---|---|---|---|
| | | Ex 1 | Ex 2 | Ex 3 |
| Dispersion at 1310 nm | ps/nm-km | −9.3 | −11.1 | −7.9 |
| Dispersion at 1550 nm | ps/nm-km | 13.9 | 12.2 | 14.0 |
| Dispersion at 1625 nm | ps/nm-km | 19.4 | 17.8 | 19.2 |
| Dispersion Slope at 1550 nm | ps/nm²-km | 0.077 | 0.078 | 0.074 |
| Kappa at 1550 nm | nm | 181 | 156 | 189 |
| MFD1550 | μm | 11.22 | 10.74 | 10.95 |
| Attenuation at 1550 nm | dB/km | 0.188 | 0.189 | 0.188 |
| Pin Array at 1550 nm | dB | 9.2 | 14.8 | 12.4 |
| LP11 cutoff (theoretical) | nm | 1587 | 1414 | 1447 |
| Fiber Cutoff | nm | 1359 | 1219 | 1258 |
| Cabled Cutoff | nm | 1259 | 1119 | 1158 |
| Zero Dispersion Wavelength | nm | 1393 | 1410 | 1384 |
| $A_{eff}$ at 1550 nm | μm² | 95.0 | 86.6 | 89.8 |
| $AOEA_{L01}$ | μm² | 318 | 285 | 297 |
| $AOEA_{L02}$ | μm² | 320 | 289 | 285 |
| $AOEA_{L03}$ | μm² | 228 | 210 | 230 |
| $AOEA_{L04}$ | μm² | 23264 | 335475 | 31745 |
| $AOEA_{L05}$ | μm² | 27432 | 27009 | 12549 |
| $AOEA_{MIN}$ | μm² | 228 | 210 | 230 |
| Ratio: $AOEA_{L01}/AOEA_{L02}$ | — | 0.99 | 0.99 | 1.04 |
| SBS Threshold (absolute) | dBm | 12.4 | 11.9 | 11.9 |
| SBS Threshold Improvement over SMF-28 ™ optical fiber | dB | 5.6 | 5.1 | 5.1 |
| $\Delta(r = 0)$ | % | 0.82 | 0.86 | 0.79 |

TABLE 1-continued

| | | Example: | | |
|---|---|---|---|---|
| | | Ex 1 | Ex 2 | Ex 3 |
| $\Delta_1(r = 0.5)$ | % | 0.74 | 0.77 | 0.72 |
| $\Delta_1(r = 1)$ | % | 0.55 | 0.56 | 0.53 |
| $\Delta(r = 1.5\ \mu m)$ | % | 0.36 | 0.35 | 0.35 |
| $\Delta(r = 2\ \mu m)$ | % | 0.24 | 0.22 | 0.24 |
| $\Delta(r = 2.5\ \mu m)$ | % | 0.19 | 0.18 | 0.20 |
| $\Delta(r = 3\ \mu m)$ | % | 0.18 | 0.17 | 0.19 |
| $\Delta(r = 3.5\ \mu m)$ | % | 0.18 | 0.17 | 0.19 |
| $\Delta(r = 4\ \mu m)$ | % | 0.18 | 0.17 | 0.19 |
| $\Delta(r = 4.5\ \mu m)$ | % | 0.18 | 0.17 | 0.19 |
| $\Delta(r = 5\ \mu m)$ | % | 0.18 | 0.17 | 0.18 |
| $\Delta(r = 5.5\ \mu m)$ | % | 0.18 | 0.15 | 0.16 |
| $\Delta(r = 6\ \mu m)$ | % | 0.17 | 0.12 | 0.12 |
| $\Delta(r = 6.5\ \mu m)$ | % | 0.14 | 0.07 | 0.07 |
| $\Delta(r = 7\ \mu m)$ | % | 0.09 | 0.03 | 0.03 |
| $\Delta(r = 7.5\ \mu m)$ | % | 0.04 | 0.01 | 0.01 |
| $\Delta(r = 8\ \mu m)$ | % | 0.01 | 0.00 | 0.00 |
| $\Delta(r = 8.5\ \mu m)$ | % | 0.00 | 0.00 | 0.00 |
| $R_{CORE}$ | μm | 8.4 | 7.7 | 7.6 |
| $\Delta_{MAX}$ | % | 0.82 | 0.86 | 0.79 |
| $R_{\Delta MAX}$ | μm | 0 | 0 | 0 |
| $\Delta_{MAX} - \Delta(r = 1\ \mu m)$ | % | 0.27 | 0.30 | 0.26 |
| $\Delta_{HHPA}$ | % | 0.41 | 0.43 | 0.395 |
| $R_{HHPA}$ | μm | 1.35 | 1.275 | 1.35 |
| $R_A$ | μm | 2.46 | 2.30 | 2.48 |
| $\Delta(r = R_A)$ | % | 0.19 | 0.19 | 0.20 |
| $\Delta_{MAXB}$ | % | 0.19 | 0.19 | 0.20 |
| $\Delta_{HHPB}$ | % | 0.095 | 0.095 | 0.1 |
| $R_{HHPB}$ | μm | 6.95 | 6.25 | 6.25 |
| $W_B$ | μm | 4.5 | 4.0 | 3.8 |
| $R_{BMID}$ | μm | 4.7 | 4.3 | 4.4 |

The optical fibers illustrated by Examples 1–3 have an optical mode effective area at 1550 nm which is not less than about 80 μm², a first acoustical mode $L_{01}$ having a first acousto-optic effective area, $AOEA_{L01}$, which is not less than 250 μm²; and a second acoustical mode $L_{02}$ having a second acousto-optic effective area, $AOEA_{L02}$, which is not less than 250 μm², wherein $0.4 < AOEA_{L01}/AOEA_{L02} < 2.5$. Preferably, the optical mode effective area at 1550 nm is between about 80 and 120 μm², more preferably between about 85 and 110 μm². In some preferred embodiments, the optical mode effective area at 1550 nm is between about 85 and 100 μm². Preferably, the fiber cutoff is less than about 1500 nm. Cabled cutoff is about 100 to 250 nm lower than the fiber cutoff for these fibers. Preferably, cabled cutoff is less than about 1500 nm, more preferably less than about 1400 nm. In some preferred embodiments, the core may comprise a relative refractive index profile having a so-called centerline dip which may occur as a result of one or more optical fiber manufacturing techniques. However, the centerline dip in any of the refractive index profiles disclosed herein is optional. The core comprises a first portion extending from the centerline to a radius of 1 μm. The core has a maximum relative refractive index $\Delta_{MAX}$ (in percent) less than 1.0%, more preferably less than 0.9%, occurring at a radius $r_{\Delta MAX}$. In preferred embodiments, $\Delta_{MAX}$ is greater than 0.7% and less than 1%. In other preferred embodiments, $\Delta_{MAX}$ is greater than 0.75% and less than 0.9%. In still other preferred embodiments, $\Delta_{MAX}$ is greater than 0.75% and less than 0.85%. The relative refractive index $\Delta_{CORE1}(r)$ is preferably greater than 0.4% and less than 1.0%, more preferably greater than 0.5% and less than 0.9%, for all radii between $R_{\Delta MAX}$ and r=1 μm. The core further comprises a second portion surrounding and directly adjacent to the first portion, the second portion extending to a radius $R_A$. $R_A$ is defined to be the intersection of the Δ%=0 axis and a straight line drawn tangent to the relative refractive index profile at a radius $r_{HHPA}$ corresponding to a half-height peak, $\Delta_{HHPA}$, of $\Delta_{MAX}$. The extrapolated straight line intersects with the $\Delta\%=0$ axis at $R_A$. The first and second portions of the core together form a central region of the core, or central segment which ends at $R_A$. Preferably, $R_A$ is between 1.5 μm and 3.5 μm, more preferably between 2.5 μm and 3 μm. In some preferred embodiments, the second portion extends to a radius of about 2.5 μm. In the second portion, $\Delta_{CORE2}(r)$ is greater than 0.1% and less than 0.8%, more preferably greater than 0.1% and less than 0.7%, throughout the second portion. In preferred embodiments, $\Delta_{CORE2}(r)$ is greater than 0.3% and less than 0.7% from $r=1$ to $r=1.5$ μm, and in preferred embodiments, $\Delta_{CORE2}(r)$ is greater than about 0.2% and less than 0.4% from $r=1.5$ to $r=2$ μm. In preferred embodiments, the difference between $\Delta_{MAX}$ and $\Delta(r=R_A)$ is greater than 0.5%. In other preferred embodiments, the difference between $\Delta_{MAX}$ and $\Delta(r=R_A) > 0.6\%$. The core comprises an annular region, or annular segment, surrounding and directly adjacent to the central segment 10. The annular segment 12 extends from $R_A$ to a radius $R_{CORE}$ of between 6 and 12 μm, more preferably between 7 and 10 μm where $\Delta_{CORE}(r)$ reaches 0%, i.e. directly adjacent to the cladding 200. The annular region comprises a maximum relative refractive index $\Delta_{MAXB}$ (in percent) which is greater than $\Delta_{CLAD}$ and less than $\Delta_{MAX}$. Preferably, the difference between $\Delta_{MAX}$ and $\Delta_{MAXB}$ is greater than 0.5%, more preferably greater than 0.6%. Preferably, $\Delta_{MAXB}$ is less than 0.3%, more preferably less than 0.25%, even more preferably greater than 0.1% and less than 0.25%. The annular segment preferably has a width $W_B$ of greater than 3 μm, more preferably greater than 4 μm, and preferably has a midpoint located at a radius $R_{BMID}$ of between 4 and 5 μm, wherein the width is measured between $R_A$ and the radius $R_{HHPB}$ corresponding to the half height peak of $\Delta_{MAXB}$. Preferably, $\Delta_{CORE}(r)$ is less than 0.1% for all radii greater than about 7 μm. Preferably, the cladding 200 surrounds and is directly adjacent to the annular segment 12. Preferably, the relative refractive index $\Delta_{CORE}(r)$ is less than 0.03% for all radii between 8 and 25 μm. Preferably, the core ends and the cladding 200 begins at $R_{CORE}$ of greater than about 7 μm, more preferably between 7 and 12 μm. The core thus comprises two segments, a central segment 10 contactingly surrounded by an annular segment 12, the annular segment being contactingly surrounded by cladding 200. For illustrative purposes, $R_A$, $R_{HHPA}$, $R_{BMID}$, $R_{HHPB}$, $R_{CORE}$, and $W_B$ for curve 3 are labeled in FIG. 1.

In preferred embodiments, optical fiber such as those illustrated by Examples 1–3 disclosed herein preferably have: a positive dispersion at 1550 nm having an absolute magnitude of greater than 10 ps/nm-km, more preferably between 10 and 21 ps/nm-km; a dispersion slope at 1550 nm of less than 0.09 ps/nm$^2$-km, more preferably between 0.07 and 0.09 ps/nm$^2$-km; dispersion zero less than 1500 nm, preferably less than 1450 nm, more preferably between 1350 and 1450 nm; an optical effective area at 1550 nm greater than 80 μm$^2$, more preferably between 80 and 120 μm$^2$, even more preferably between 85 μm$^2$ and 110 μm$^2$; an optical mode field diameter at 1550 nm of greater than 10.5 μm; and pin array bend loss at 1550 nm less than 15 dB. Preferably, the attenuation at 1550 nm is less than 0.20 dB/km, more preferably less than 0.19 dB/km.

Preferably, the relative refractive index of the second portion monotonically decreases for increasing radius. Preferably, the second portion has an alpha of between about 3 to 5, more preferably between about 3 to 4.

Preferably, at least a part of the annular segment 12 has a relative refractive index which is relatively flat, i.e. of relatively constant value. Preferably, the absolute magnitude of the difference in $\Delta(r)$ between any radii between $r=3$ μm and $r=5$ μm is less than 0.07%, more preferably less than 0.05%.

$A_{LO1}$ may be greater than $A_{LO2}$, or $A_{LO2}$ may be greater than $A_{LO1}$, or $A_{LO1}$ may be substantially equal to $A_{LO2}$. Preferably, $A_{LO1}$ and $A_{LO2}$ are both greater than 250 μm$^2$, more preferably greater than 275 μm$^2$, and even more preferably greater than 300 μm$^2$.

In preferred embodiments, $0.5 < AOEA_{LO1}/AOEA_{LO2} < 2$. In other preferred embodiments, $0.6 < AOEA_{LO1}/AOEA_{LO2} < 1.5$.

Cladding 200, or a cladding layer, shown in FIG. 1 where $\Delta_{CLAD}=0$, surrounds and is directly adjacent the outer region of the core.

Optical fiber such as Examples 1–3 can thus be described as having a core comprising a central segment 10, and an annular segment 12 surrounding and directly adjacent to the central segment. The core preferably has an entirely positive refractive index and $\Delta_{MAX} > \Delta_{MAXB} > 0$. Preferably, the relative refractive index profile in the first portion comprises a substantially flat part. Preferably, the relative refractive index profile of the annular segment 12 comprises a substantially flat part, and more preferably, a substantial part of the annular segment has a substantially flat relative refractive index profile. The absolute SBS threshold in dBm is greater than about $10+10 \log [(1-e^{-(0.19)(50)/4.343})/(1-e^{-(\alpha)(L)/4.343})]$, preferably greater than about greater than about $11+10 \log [(1-e^{-(0.19)(50)/4343})/(1-e^{-(\alpha)(L)/4343})]$, wherein L is the length in km and α is the attenuation at 1550 nm. In some preferred embodiments, the absolute SBS threshold in dBm is greater than about $12+10 \log [(1-e^{-(0.19)(50)/4.343})/(1-e^{-(\alpha)(L)/4.343})]$, wherein L is the length in km and α is the attenuation at 1550 n.

2$^{nd}$ Set of Preferred Embodiments

Figure 2:
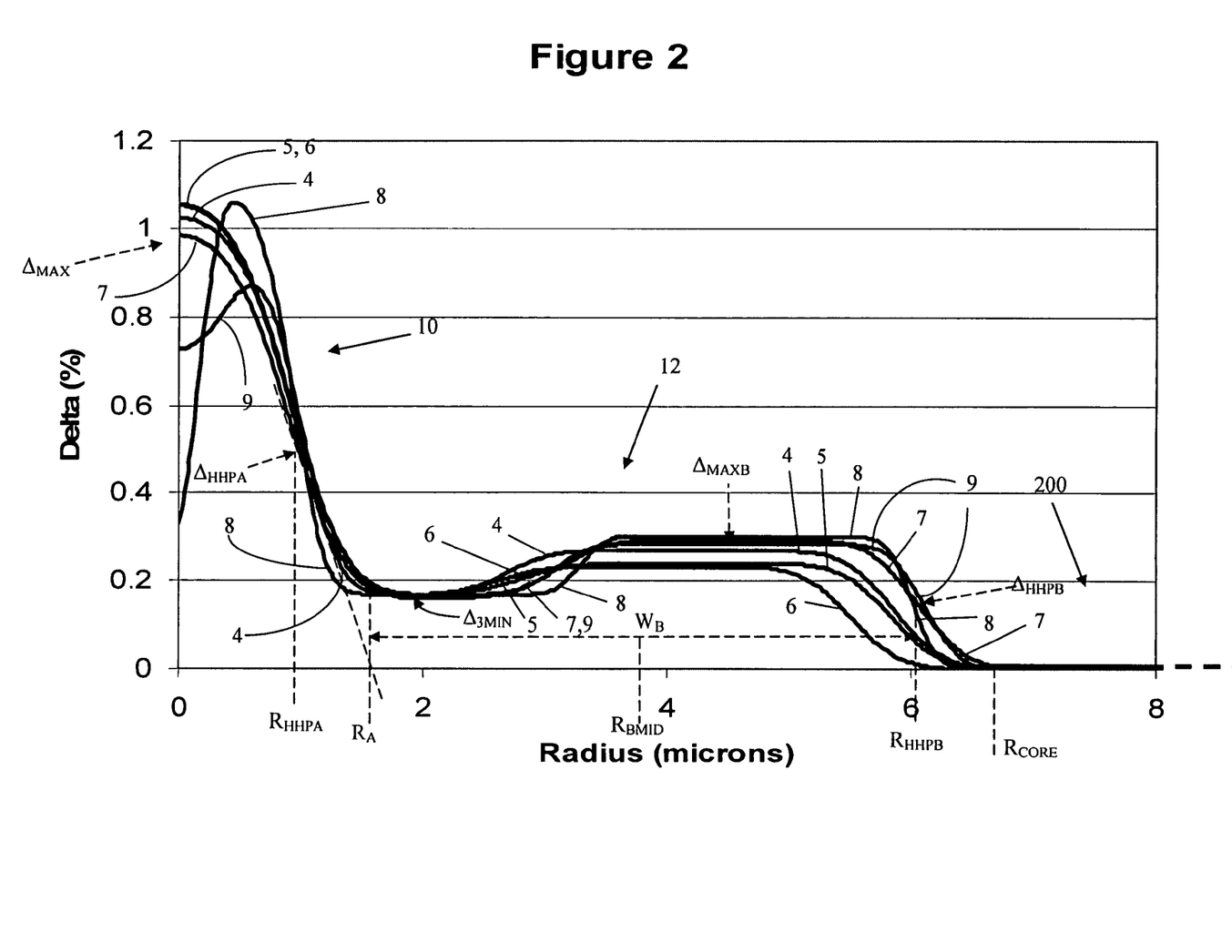
FIG. 2 shows refractive index profiles corresponding to a second set of preferred embodiments of an optical waveguide fiber as disclosed herein.

Table 2 lists an illustrative second set of preferred embodiments, Examples 4–8. FIG. 2 shows the corresponding refractive index profiles of Examples 4–8 in curves 4–8, respectively.

TABLE 2

| | | Example: | | | | | |
|---|---|---|---|---|---|---|---|
| | | Ex 4 | Ex 5 | Ex 6 | Ex 7 | Ex 8 | Ex 9 |
| Dispersion at 1310 nm | ps/nm-km | −5.7 | −8.5 | −9.0 | −2.3 | −5.2 | −3.0 |
| Dispersion at 1550 nm | ps/nm-km | 16.4 | 14.8 | 13.9 | 18.3 | 17.2 | 17.9 |

TABLE 2-continued

| | | Example: | | | | | |
|---|---|---|---|---|---|---|---|
| | | Ex 4 | Ex 5 | Ex 6 | Ex 7 | Ex 8 | Ex 9 |
| Dispersion at 1625 nm | ps/nm-km | 21.5 | 20.1 | 19.2 | 23.2 | 22.3 | 22.9 |
| Dispersion Slope at 1550 nm | ps/nm$^2$-km | 0.072 | 0.075 | 0.074 | 0.068 | 0.072 | 0.069 |
| Kappa @ 1550 nm | nm | 228 | 197 | 188 | 269 | 239 | 259 |
| MFD1550 | μm | 11.17 | 11.02 | 10.76 | 11.84 | 11.52 | 11.72 |
| Attenuation at 1550 nm | dB/km | 0.194 | 0.193 | 0.193 | 0.194 | 0.202 | 0.196 |
| Pin Array at 1550 nm | dB | 5.0 | 9.3 | 13.1 | 4.9 | 4.1 | 4.6 |
| LP11 cutoff (theoretical) | nm | 1583 | 1493 | 1395 | 1685 | 1683 | 1682 |
| Fiber Cutoff | nm | 1408 | 1320 | 1238 | 1490 | 1495 | 1489 |
| Cabled Cutoff | nm | 1308 | 1220 | 1138 | 1390 | 1395 | 1389 |
| Zero Dispersion Wavelength | nm | 1360 | 1382 | 1389 | 1331 | 1354 | 1338 |
| $A_{eff}$ at 1550 nm | μm$^2$ | 98.4 | 94.5 | 89.2 | 113.9 | 109.0 | 111.0 |
| $AOEA_{L01}$ | μm$^2$ | 476 | 430 | 393 | 662 | 504 | 485 |
| $AOEA_{L02}$ | μm$^2$ | 467 | 423 | 377 | 489 | 320 | 488 |
| $AOEA_{L03}$ | μm$^2$ | 260 | 258 | 232 | 327 | 554 | 380 |
| $AOEA_{L04}$ | μm$^2$ | 1503 | 1105 | 1228 | 1824 | 3400 | 1763 |
| $AOEA_{L05}$ | μm$^2$ | 844 | 872 | 1030 | 707 | 696 | 741 |
| $AOEA_{MIN}$ | μm$^2$ | 260 | 258 | 232 | 327 | 320 | 380 |
| Ratio: $AOEA_{L01}/AOEA_{L02}$ | — | 1.02 | 1.02 | 1.04 | 1.35 | 1.58 | 1.58 |
| SBS Threshold (absolute) | dBm | 14.1 | 13.7 | 13.3 | 15.6 | 14.4 | 13.2 |
| SBS Threshold Improvement over SMF-28™ optical fiber | dB | 7.3 | 6.9 | 6.5 | 8.8 | 7.6 | 6.4 |
| $\Delta(r = 0)$ | % | 1.02 | 1.05 | 1.05 | 0.98 | 0.33 | 0.73 |
| $\Delta_1(r = 0.5)$ | % | 0.92 | 0.94 | 0.93 | 0.87 | 1.05 | 0.86 |
| $\Delta_1(r = 1)$ | % | 0.53 | 0.52 | 0.52 | 0.48 | 0.51 | 0.55 |
| $\Delta(r = 1.5\ \mu m)$ | % | 0.20 | 0.21 | 0.21 | 0.19 | 0.17 | 0.18 |
| $\Delta(r = 2\ \mu m)$ | % | 0.16 | 0.17 | 0.17 | 0.16 | 0.17 | 0.17 |
| $\Delta(r = 2.5\ \mu m)$ | % | 0.19 | 0.18 | 0.19 | 0.16 | 0.17 | 0.17 |
| $\Delta(r = 3\ \mu m)$ | % | 0.25 | 0.22 | 0.23 | 0.21 | 0.17 | 0.21 |
| $\Delta(r = 3.5\ \mu m)$ | % | 0.27 | 0.24 | 0.23 | 0.28 | 0.29 | 0.28 |
| $\Delta(r = 4\ \mu m)$ | % | 0.27 | 0.24 | 0.23 | 0.29 | 0.30 | 0.28 |
| $\Delta(r = 4.5\ \mu m)$ | % | 0.27 | 0.24 | 0.23 | 0.29 | 0.30 | 0.28 |
| $\Delta(r = 5\ \mu m)$ | % | 0.27 | 0.24 | 0.22 | 0.29 | 0.30 | 0.28 |
| $\Delta(r = 5.5\ \mu m)$ | % | 0.23 | 0.20 | 0.12 | 0.28 | 0.30 | 0.28 |
| $\Delta(r = 6\ \mu m)$ | % | 0.09 | 0.07 | 0.01 | 0.17 | 0.16 | 0.19 |
| $\Delta(r = 6.5\ \mu m)$ | % | 0.01 | 0.00 | 0.00 | 0.02 | 0.00 | 0.01 |
| $\Delta(r = 7\ \mu m)$ | % | 0.00 | 0.00 | 0.00 | 0.00 | 0.00 | 0.00 |
| $R_{CORE}$ | μm | 6.53 | 6.48 | 6.15 | 6.75 | 6.35 | 6.6 |
| $\Delta_{MAX}$ | % | 1.02 | 1.05 | 1.05 | 0.98 | 1.06 | 0.87 |
| $R_{\Delta MAX}$ | μm | 0.00 | 0.00 | 0.00 | 0.00 | 0.45 | 0.6 |
| $\Delta_{MAX} - \Delta(r = 1\ \mu m)$ | % | 0.49 | 0.53 | 0.53 | 0.5 | 0.55 | 0.05 |
| $\Delta_{HHPA}$ | % | 0.51 | 0.53 | 0.53 | 0.49 | 0.53 | 0.3 |
| $R_{HHPA}$ | μm | 1 | 1 | 1 | 1 | 1 | 1.2 |
| $R_A$ | μm | 1.56 | 1.55 | 1.55 | 1.55 | 1.30 | 1.55 |
| $\Delta(r = R_A)$ | % | 0.19 | 0.20 | 0.20 | 0.18 | 0.19 | 0.18 |
| $\Delta_{MAX} - \Delta(r = R_A)$ | % | 0.83 | 0.85 | 0.85 | 0.80 | 0.87 | 0.69 |
| $\Delta_{MAXB}$ | % | 0.27 | 0.24 | 0.23 | 0.29 | 0.30 | 0.28 |
| $\Delta_{MAX} - \Delta_{MAXB}$ | % | 0.75 | 0.81 | 0.82 | 0.69 | 0.76 | 0.32 |
| $\Delta_{HHPB}$ | % | 0.135 | 0.12 | 0.12 | 0.145 | 0.15 | 0.14 |
| $R_{HHPB}$ | μm | 5.85 | 5.8 | 5.5 | 6.1 | 6 | 6.1 |
| $W_B$ | μm | 4.4 | 4.3 | 4.0 | 4.7 | 5 | 4.6 |
| $R_{BMID}$ | μm | 3.7 | 3.6 | 3.5 | 3.8 | 3.5 | 3.8 |
| $\Delta_{3MIN}$ | % | 0.16 | 0.17 | 0.17 | 0.16 | 0.17 | 0.17 |
| $\Delta_{MAXB} - \Delta_{3MIN}$ | % | 0.11 | 0.07 | 0.06 | 0.13 | 0.13 | 0.11 |

The optical fibers illustrated by Examples 4–9 have an optical mode effective area at 1550 nm which is not less than about 80 µm², a first acoustical mode $L_{01}$ having a first acousto-optic effective area, $AOEA_{L01}$, which is not less than 250 µm²; and a second acoustical mode $L_{02}$ having a second acousto-optic effective area, $AOEA_{L02}$, which is not less than 250 µm², wherein $0.4 < AOEA_{L01}/AOEA_{L02} < 2.5$. Preferably, the optical mode effective area at 1550 nm is between about 80 and 120 µm², more preferably between about 85 and 115 µm². In some preferred embodiments, the optical mode effective area at 1550 nm is between about 85 and 100 µm². Preferably, the fiber cutoff is less than about 1500 nm. Cabled cutoff is about 100 to 250 nm lower than the fiber cutoff for these fibers. Preferably, cabled cutoff is less than about 1500 nm, more preferably less than about 1400 nm. In some preferred embodiments, such as that illustrated by Examples 8 and 9, the core may comprise a relative refractive index profile having a so-called centerline dip which may occur as a result of one or more optical fiber manufacturing techniques. However, the centerline dip in any of the refractive index profiles disclosed herein is optional. The core comprises a first portion extending from the centerline to a radius of 1 µm. The core has a maximum relative refractive index $\Delta_{MAX}$ (in percent) less than 1.3%, more preferably less than 1.2%, more preferably less than 1.1%, occurring at a radius $r_{\Delta MAX}$. In preferred embodiments, $\Delta_{MAX}$ is greater than 0.9% and less than 1.2%. In other preferred embodiments, $\Delta_{MAX}$ is greater than 0.95% and less than 1.1%. In still other preferred embodiments, $\Delta_{MAX}$ is greater than 1.0% and less than 1.2%. The relative refractive index $\Delta_{CORE1}(r)$ is preferably greater than 0.3% and less than $\Delta_{MAX}$, more preferably greater than 0.4% and less than $\Delta_{MAX}$ for all radii between $r_{\Delta MAX}$ and r=1 µm. The core further comprises a second portion surrounding and directly adjacent to the first portion, the second portion extending to a radius $R_A$. $R_A$ is defined to be the intersection of the $\Delta\%=0$ axis and a straight line drawn tangent to the relative refractive index profile at a radius $R_{HHPA}$ corresponding to a half-height peak, $\Delta_{HHPA}$, of $\Delta_{MAX}$. The extrapolated straight line intersects with the $\Delta\%=0$ axis at $R_A$. The first and second portions of the core together form a central region of the core, or central segment 10 which ends at $R_A$. Preferably, $R_A$ is between 1 µm and 3 µm, more preferably between 1 µm and 2 µm. In some preferred embodiments, the second portion extends to a radius of about 1.5 µm. In the second portion, $\Delta_{CORE2}(r)$ is greater than 0.05% and less than 0.8%, more preferably greater than 0.1% and less than 0.7%, throughout the second portion. In preferred embodiments, $\Delta_{CORE2}(r)$ is greater than 0.1% and less than 0.6% from r=1 to r=1.5 µm, and in preferred embodiments, $\Delta_{CORE2}(r)$ is greater than about 0.15% and less than 0.6% from r=1.5 to r=2 µm. Preferably, the difference between $\Delta_{MAX}$ and $\Delta(r=R_A)$ is greater than 0.5%, more preferably >0.6%, even more preferably >0.7%, and still more preferably >0.8%. In preferred embodiments, the difference between $\Delta_{MAX}$ and $\Delta(r=R_A)$ is between 0.8% and 0.9%. The core further comprises a third portion surrounding and directly adjacent to the second portion, and a fourth portion surrounding and directly adjacent to the third portion. In preferred embodiments, the third portion extends from $R_A$ to a radius of $R_3$ of about 3 µm. Together, the third and fourth portions form an annular region, or annular segment, surrounding and directly adjacent to the central segment 10. The annular region extends from $R_A$ to a radius $R_{CORE}$ of between 4 and 12 µm, more preferably between 5 and 10 µm, even more preferably between 5 and 8 µm, where $\Delta_{CORE}(r)$ reaches 0%. The annular region comprises a maximum relative refractive index $\Delta_{MAXB}$ (in percent) which is greater than $\Delta_{CLAD}$ and less than $\Delta_{MAX}$. $\Delta_{MAXB}$ occurs in the fourth portion of the core in the annular segment 12. In preferred embodiments, the fourth portion of the core has a substantially flat part with a substantially constant relative refractive index around $\Delta_{MAXB}$, wherein the relative refractive index changes by less than about 0.02% over a radial distance of at least about 1 µm. The annular region also comprises a relative refractive index $\Delta_{3MIN}$ (in percent) which is greater than $\Delta_{CLAD}$ and less than $\Delta_{MAX}$ and less than $\Delta_{MAXB}$. $\Delta_{3MIN}$ occurs in the third portion of the core, i.e. in the inner part of the annular segment 12. Preferably, the difference between $\Delta_{MAX}$ and $\Delta_{MAXB}$ is greater than 0.5%, more preferably greater than 0.6%. Preferably, $\Delta_{MAXB}$ is less than 0.4%, more preferably less than 0.35%, even more preferably greater than 0.1% and less than 0.35%, and still more preferably greater than 0.2% and less than 0.35%. Preferably, the difference between $\Delta_{MAXB}$ and $\Delta_{3MIN}$ is less than 0.2%, more preferably less than 0.15%. Preferably, $\Delta_{3MIN}$ is less than 0.25%, more preferably less than 0.20%, even more preferably greater than 0.1% and less than 0.20%, and still more preferably greater than 0.15% and less than 0.20%. In preferred embodiments, the third portion of the core has a substantially constant relative refractive index around $\Delta_{3MIN}$, wherein the relative refractive index changes by less than about 0.02% over a radial distance of about 0.5 µm. The annular segment preferably has a width $W_B$ of between 3 and 6 µm, more preferably between 3.5 and 5.5 µm, and preferably has a midpoint $R_{BMID}$ located at a radius of between 3 and 4 µm, wherein the width is measured between $R_A$ and the radius $R_{HHPB}$ corresponding to the half height peak of $\Delta_{MAXB}$ occurring in the fourth portion of the core, i.e. in the outer part of the annular segment. Preferably, $\Delta_{CORE4}(r)$ is less than 0.1% for all radii greater than about 7 µm. Preferably, the cladding 200 surrounds and is directly adjacent to the annular segment 14. Preferably, the relative refractive index is less than 0.03% for all radii between 8 and 25 µm. Preferably, the core ends and the cladding 200 begins at RCORE of greater than about 7 µm, more preferably between 7 and 12 µm. The core thus comprises two segments, a central segment 10 contactingly surrounded by an annular segment 12, the annular segment being contactingly surrounded by cladding 200. For illustrative purposes, $R_A$, $R_{HHPA}$, $R_{BMID}$, $R_{HHPB}$, $R_{CORE}$, and $W_B$ for curve 7 are labeled in FIG. 1.

In preferred embodiments, optical fiber such as those illustrated by Examples 4–9 disclosed herein preferably have: a positive dispersion at 1550 nm having an absolute magnitude of greater than 10 ps/nm-km, more preferably between 10 and 21 ps/nm-km; a dispersion slope at 1550 nm of less than 0.09 ps/nm²-km, more preferably between 0.07 and 0.09 ps/nm²-km; dispersion zero less than 1500 nm, preferably less than 1450 nm, more preferably less than 1400 nm, even more preferably between 1330 and 1400 nm; an optical effective area at 1550 nm greater than 80 µm², more preferably greater than 85 µm², even more preferably between 85 and 120 µm², still more preferably between 85 µm² and 110 µm²; an optical mode field diameter at 1550 nm of greater than 10.5 µm; and pin array bend loss at 1550 nm less than 15 dB. Preferably, the attenuation at 1150 nm is less than 0.20 dB/km.

In preferred embodiments, the relative refractive index of the second portion monotonically decreases for increasing radius. Preferably, the second portion has an alpha of between about 3 to 5, more preferably between about 4 and 5.

Preferably, at least a part of the annular segment 12 has a relative refractive index which is relatively flat, i.e. of relatively constant value. Preferably, the absolute magnitude of the difference in $\Delta(r)$ between any radii between r=3.5 μm and r=5 μm is less than 0.07%, more preferably less than 0.05%.

$A_{LO1}$ may be greater than $A_{LO2}$, or $A_{LO2}$ may be greater than $A_{LO1}$, or $A_{LO1}$ may be substantially equal to $A_{LO2}$. Preferably, $A_{LO1}$ and $A_{LO2}$ are both greater than 250 μm², more preferably greater than 275 μm², and even more preferably greater than 300 μm². In preferred embodiments, $A_{LO1}$ and $A_{LO2}$ are both greater than 350 μm² In other preferred embodiments, $A_{LO1}$ and $A_{LO2}$ are both greater than 400 μm² In still other preferred embodiments, $A_{LO1}$ and $A_{LO2}$ are both greater than 400 μm².

In preferred embodiments, $0.5 < AOEA_{LO1}/AOEA_{LO2} < 2$. In other preferred embodiments, $0.6 < AOEA_{LO1}/AOEA_{LO2} < 1.5$.

Cladding 200, or a cladding layer, shown in FIG. 2 where $\Delta_{CLAD}=0$, surrounds and is directly adjacent the outer region of the core.

Optical fiber such as Examples 4–9 can thus be described as having a core comprising a central segment 10, and an annular segment 12 surrounding and directly adjacent to the central segment. The core preferably has an entirely positive refractive index and $\Delta_{MAX} > \Delta_{MAXB} > \Delta_{3MIN} > 0$. Preferably, a substantial part of the annular segment has a substantially flat relative refractive index profile. The absolute SBS threshold in dBm is greater than about $10+10 \log [(1-e^{-(0.19)(50)/4.343})/(1-e^{-(\alpha)(L)/4.343})]$, preferably greater than about greater than about $11+10 \log [(1-e^{-(0.19)(50)/4.343})/(1-e^{-(\alpha)(L)/4.343})]$, more preferably greater than about greater than about $12+10 \log [(1-e^{-(0.19)(50)/4.343})/(1-e^{-(\alpha)(L)/4.343})]$, and even more preferably greater than about greater than about $13+10 \log [(1-e^{-(0.19)(50)/4.343})/(1-e^{-(\alpha)(L)/4.343})]$, wherein L is the length in km and a is the attenuation at 1550 nm. In some preferred embodiments, the absolute SBS threshold in dBm is greater than about $14+10 \log [(1-e^{-(0.19)(50)/4.343})/(1-e^{-(\alpha)(L)/4.343})]$, and in other preferred embodiments, the absolute SBS threshold in dBm is greater than about $15+10 \log [(1-e^{-(0.19)(50)/4.343})/(1-e^{-(\alpha)(L)/4.343})]$, wherein L is the length in km and a is the attenuation at 1550 nm.

Preferably, the optical fiber disclosed herein has an attenuation at 1380 μm which is not more than 0.3 dB/km greater than an attenuation at 1310 μm, more preferably not more than 0.1 dB/km greater, even more preferably not more than 0.05 dB/km greater. In preferred embodiments, the attenuation at 1380 nm is not more than the attenuation at 1310 nm. In other preferred embodiments, the attenuation at 1380 nm is less than 0.3 dB/km. In a preferred set of embodiments, the absolute SBS threshold is greater than $10+10 \log [(1-e^{-(0.19)(50)/4.343})/(1-e^{-(\alpha)(L)/4.343})]$ dBm, preferably greater than $11+10 \log [(1-e^{-(0.19)(50)/4.343})/(1-e^{-(\alpha)(L)/4.343})]$ dBm (where L is the length of the fiber in km and a is the attenuation of the fiber at 1550 nm) and the attenuation at 1380 μm is not more than 0.3 dB/km greater than an attenuation at 1310 μm, more preferably not more than 0.1 dB/km greater, even more preferably not more than 0.05 dB greater, and in preferred embodiments the attenuation at 1380 nm is not more than the attenuation at 1310 nm. In other preferred embodiments, the attenuation at 1380 nm is less than 0.3 dB/km. In some preferred embodiments, the optical effective area at 1550 nm is greater than 80 μm², and in other preferred embodiments, the optical effective area at 1550 nm is greater than 80 μm² and less than 120 μm².

The optical fiber disclosed herein preferably exhibits a PMD of less than 0.1 ps/sqrt(km), more preferably 0.05 ps/sqrt(km), and even more preferably less than 0.02 ps/sqrt (km). In preferred embodiments, the pin array bend loss at 1550 nm is less than 5 dB, more preferably less than 3 dB. In preferred embodiments, the pin array bend loss at 1620 nm is less than 10 dB, more preferably less than 7 dB, more preferably less than 5 dB.

Preferably, the optical fiber disclosed herein has a cabled cutoff of less than 1500 nm, more preferably less than 1400 nm.

Preferably, the optical fiber disclosed herein is capable of transmitting optical signals in the 1260 nm to 1625 nm wavelength range.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

Figure 3:
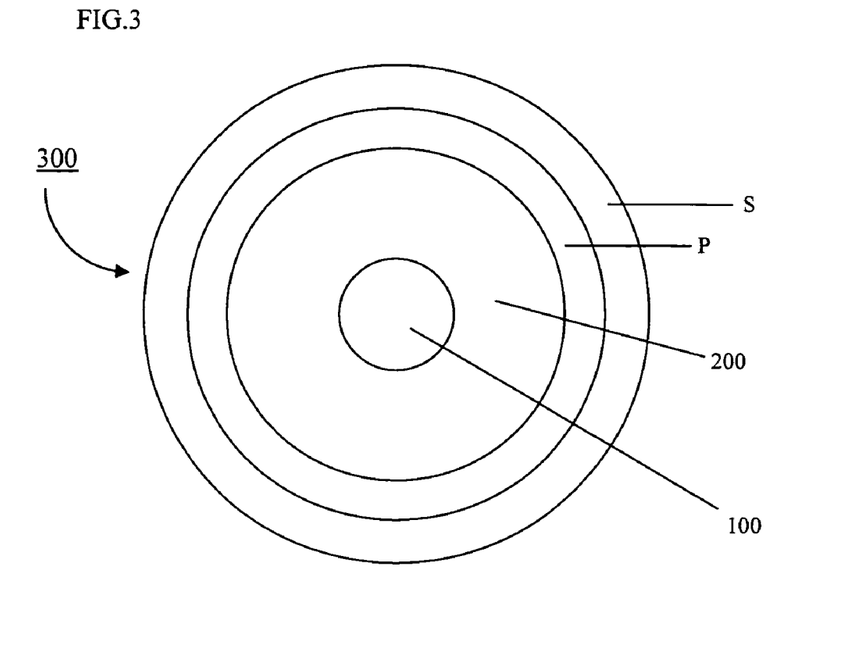
FIG. 3 is a schematic cross-sectional view of a preferred embodiment of an optical waveguide fiber as disclosed herein.

FIG. 3 is a schematic representation (not to scale) of an optical waveguide fiber 300 as disclosed herein having core 100 and an outer annular cladding or outer cladding layer or clad layer 200 directly adjacent and surrounding the core 100.

Preferably, the cladding contains no germania or fluorine dopants therein. More preferably, the cladding 200 of the optical fiber disclosed herein is pure or substantially pure silica. The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 may include one or more dopants. The clad layer 200 is surrounded by a primary coating P and a secondary coating S. The refractive index of the cladding 200 is used to calculate the relative refractive index percentage as discussed elsewhere herein.

Referring to the Figures, the clad layer 200 has a refractive index of $n_c$ surrounding the core which is defined to have a $\Delta(r)=0\%$, which is used to calculate the refractive index percentage of the various portions or regions of an optical fiber or optical fiber preform.

Figure 4:
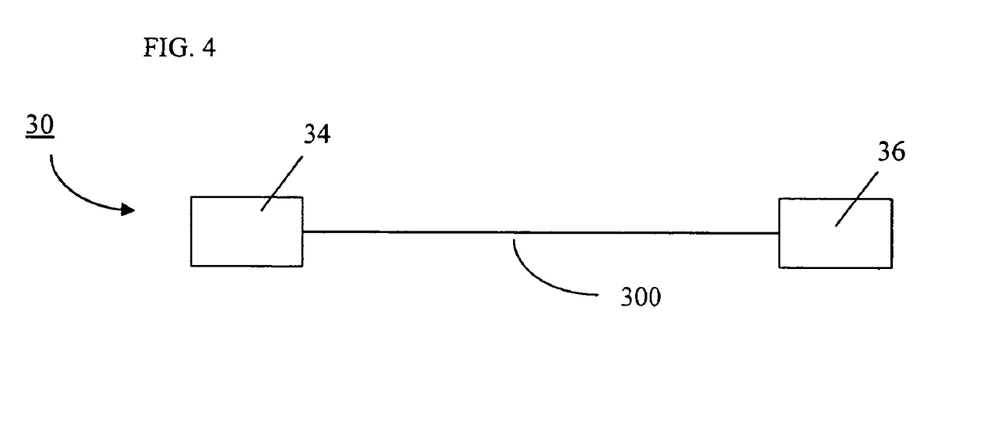
FIG. 4 is a schematic view of a fiber optic communication system employing an optical fiber as disclosed herein.

As shown in FIG. 4, an optical fiber 300 as disclosed herein may be implemented in an optical fiber communication system 30. System 30 includes a transmitter 34 and a receiver 36, wherein optical fiber 300 allows transmission of an optical signal between transmitter 34 and receiver 36. System 30 is preferably capable of 2-way communication, and transmitter 34 and receiver 36 are shown for illustration only. The system 30 preferably includes a link which has a section or a span of optical fiber as disclosed herein. The system 30 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Preferably, the optical fibers disclosed herein have a low water content, and preferably are low water peak optical fibers, i.e. having an attenuation curve which exhibits a relatively low, or no, water peak in a particular wavelength region, especially in the E-band.

Methods of producing low water peak optical fiber can be found in PCT Application Publication Numbers WO00/64825, WO01/47822, and WO02/051761, the contents of each being hereby incorporated by reference.

A soot preform or soot body is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which typically includes hydrogen bonded to oxygen. The soot body may be formed, for example, by depositing layers of soot onto a bait rod via an OVD process.

A substrate or bait rod or mandrel is inserted through a glass body such as a hollow or tubular handle and mounted on a lathe. The lathe is designed to rotate and translate the mandrel in close proximity with a soot-generating burner. As the mandrel is rotated and translated, silica-based reaction product, known generally as soot, is directed toward the mandrel. At least a portion of silica-based reaction product is deposited on the mandrel and on a portion of the handle to form a body thereon.

Once the desired quantity of soot has been deposited on the mandrel, soot deposition is terminated and the mandrel is removed from the soot body.

Upon removal of the mandrel, the soot body defines a centerline hole passing axially therethrough. Preferably, the soot body is suspended by a handle on a downfeed device and positioned within a consolidation furnace. The end of the centerline hole remote from the handle is preferably fitted with a bottom plug prior to positioning the soot body within the consolidation furnace. Preferably, the bottom plug is positioned and held in place with respect to the soot body by friction fit. The plug is further preferably tapered to facilitate entry and to allow at least temporary affixing, and at least loosely, within the soot body.

The soot body is preferably chemically dried, for example, by exposing soot body to a chlorine-containing atmosphere at elevated temperature within consolidation furnace. A chlorine-containing atmosphere effectively removes water and other impurities from soot body, which otherwise would have an undesirable effect on the properties of the optical waveguide fiber manufactured from the soot body. In an OVD formed soot body, the chlorine flows sufficiently through the soot to effectively dry the entire preform, including the centerline region surrounding centerline hole.

Following the chemical drying step, the temperature of the furnace is elevated to a temperature sufficient to consolidate the soot blank into a sintered glass preform, preferably about 1500° C. The centerline hole is then closed during the consolidation step so that the centerline hole does not have an opportunity to be rewetted by a hydrogen compound prior to centerline hole closure. Preferably, the centerline region has a weighted average OH content of less than about 1 ppb.

Exposure of the centerline hole to an atmosphere containing a hydrogen compound can thus be significantly reduced or prevented by closing the centerline hole during consolidation.

As described above and elsewhere herein, the plugs are preferably glass bodies having a water content of less than about 31 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 µm to about 2 mm. Even more preferably, at least a portion of a top plug has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion. A consolidated glass preform is preferably heated to an elevated temperature which is sufficient to stretch the glass preform, preferably about 1950° C. to about 2100° C., and thereby reduce the diameter of the preform to form a cylindrical glass body, such as a core cane or an optical fiber, wherein the centerline hole collapses to form a solid centerline region. The reduced pressure maintained within the sealed centerline hole created passively during consolidation is generally sufficient to facilitate complete centerline hole closure during the draw (or redraw) process. Consequently, overall lower O-H overtone optical attenuation can be achieved. For example, the water peak at 1383 nm, as well as at other OH induced water peaks, such as at 950 nm or 1240 nm, can be lowered, and even virtually eliminated.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm. Generally, for greater OH impurities in a fiber, the water peak grows in width as well as in height. Therefore, a wider choice of more efficient operation, whether for operating signal wavelengths or amplification with pump wavelengths, is afforded by the smaller water peak. Thus, reducing OH impurities can reduce losses between, for example, for wavelengths between about 1260 nm to about 1650 nm, and in particular reduced losses can be obtained in the 1383 nm water peak region thereby resulting in more efficient system operation.

The fibers disclosed herein exhibit low PMD values particulary when fabricated with OVD processes. Spinning of the optical fiber may also lower PMD values for the fiber disclosed herein.

Brillouin scattering loss of the optical fiber disclosed herein, and in particular of Ge-doped optical fiber, may be further reduced by modulating the tension applied to the fiber during draw. At least a portion, preferably an end portion, of an optical fiber preform is heated to a high temperature so that an optical fiber can be drawn, such as by lowering the preform into an RF induction furnace and heating it to a melting temperature, the preform comprising a high purity, low loss germanium silicate glass core surrounded by an outer layer of glass cladding with a lower index of refraction than the core. Fiber is then drawn from the heated preform at an appropriately modulated tension. Upon sufficient heating, a melted end portion of the preform bearing a glass strand drops, and the strand is inserted into a fiber drawing station. The parameters are then adjusted to produce a fiber of desired diameter and uniformity. The fiber drawing speed and tension can be under control of a computer. the draw tension on the fiber is modulated with respect to fiber length in a sinusoidal, triangular or, preferably, a trapezoidal waveform essentially between a minimum in the range 10 to 50 g and a maximum in the range 150 to 250 g. The sinusiodal waveform is actually the positive half of a true sinusoid, and its wavelength as referred to herein is the length from the minimum tension range to the maximum back to the minimum. The preferred wavelength of a sinusoidal is in the range 3 to 30 km. The preferred triangular waveform is characterized by a base along the length in the range 3 to 30 km; and the preferred trapezoidal waveform has a pair of bases along the fiber length: a major base in the range 3 km to 15 km and a minor base in the range 1 km to 13 km. The resulting product is drawn optical fiber having a Ge-doped core and a cladding surrounding the core. The core is characterized by a repeated pattern of modulated strain. The strain is modulated with length between a low produced by 10–50 g of stress in the draw to a high produced by 150–250 g stress in the draw. The modulation pattern is characterized by a repetition length in the range 3 to 30 km. The pattern waveform is preferably sinusoidal, triangular or trapezoidal. Also see U.S. Pat. No. 5,851,259, which is incorporated herein by reference in its entirety.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of optical fiber.

The system preferably further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band.

In one preferred embodiment, the system comprises a section of optical fiber as disclosed herein having a length of not more than 20 km. In another preferred embodiment, the system comprises a section of optical fiber as disclosed herein having a length of greater than 20 km. In yet another preferred embodiment, the system comprises a section of optical fiber as disclosed herein having a length of greater than 70 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

In a preferred embodiment, a system disclosed herein comprises an optical source, an optical fiber as disclosed herein optically coupled to the optical source, and a receiver optically coupled to the optical fiber for receiving the optical signals transmitted through the optical fiber, the optical source having the capability of dithering, and/or phase modulating, and/or amplitude modulating, the optical signal generated by the optical source, and the optical signal is received by the receiver.

Stimulated Brillouin scattering (SBS) can be measured by a measurement system that records input power ($P_{in}$) and backscattered power ($P_{bs}$) as input power is varied over a defined range of input powers. Various systems and/or methods of determining the SBS threshold of an optical fiber could be used to characterize the fiber. One preferred method and system are disclosed herein.

Figure 5:
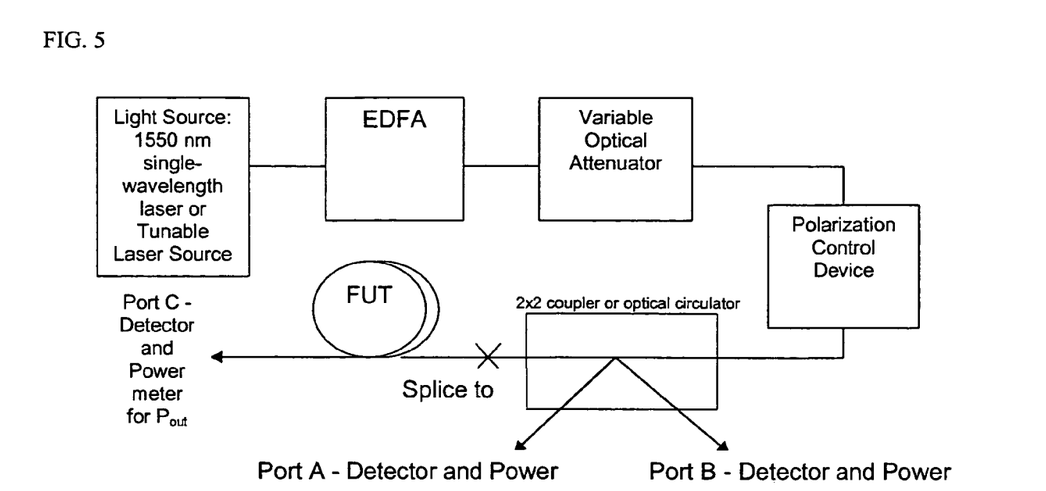
FIG. 5 is a schematic of a representative measurement system for measuring SBS threshold.

The measurement system disclosed herein comprises a light source, an erbium-doped fiber amplifier (EDFA), a variable optical attenuator (VOA), a polarization controller, an optical power routing device such as a two-by-two coupler or an optical circulator, and several optical power detectors and power meters. Single-mode patchcords with FC/APC connectors join these components. A representative measurement system is shown in FIG. 5.

The light source, which may be a tunable or single-wavelength continuous wave laser, has a very narrow spectral width, about 150 kHz or less. The wavelength is preferably centered around 1550 nm, but can vary within the gain band of the EDFA. An EDFA is used to amplify the optical signal to power levels that can induce SBS in the fiber under test. A variable optical attenuator (VOA) is used to vary the optical power that is launched into the fiber under test. The VOA is selected to allow sufficiently fine step sizes and sufficient range to allow the measurement of input power and backscattered power across a broad range of input powers. A polarization control device is preferably used to establish 100% degree of polarization and a stable state of polarization. A two-by-two directional coupler or optical circulator directs power to the fiber under test and supports the monitoring of backscattered power (Port B) and/or input power (Port A). The fiber under test (FUT) is connected to the coupler or circulator with a fusion splice or other reflectionless connection device or method. A third detector may be used to monitor output power at Port C. Unless otherwise noted herein, SBS threshold values reported herein correspond to subjecting the optical fiber to the output of a continuous wave laser having a very narrow spectral width, about 150 kHz or less. Higher threshold values may be obtained for the same fiber when subjected to the output of sources having dithered or wider spectral widths. SBS threshold values reported herein correspond to optical fibers having a length of about 50 km, unless otherwise noted. It should be understood that the SBS threshold measurements could be performed on different lengths of fiber.

To conduct a measurement, a fiber is spliced into the system and the coupler taps are connected to the optical power detectors. The laser is activated and the EDFA yields a fixed output power. The VOA attenuation is stepped across a selected range in small increments, from a high inserted loss value to zero. For example, in one embodiment the step size is 0.1 dB and the scan range is 20 dB.

Reference measurement is conducted to obtain the actual input power. Although the input power is monitored during this process, the reference measurement allows a determination of actual input power without having to account for polarization dependent loss (PDL) and splice loss. This measurement is conducted on a two-meter sample of the fiber under test. The fiber is cutback and connected to Port C. The VOA scan is repeated over the same range, and the reference input power is recorded at Port C. These power values are used as the input powers of record. The input power and backscattered power level are recorded at each step (see curve P in FIG. 6).

Figure 6:
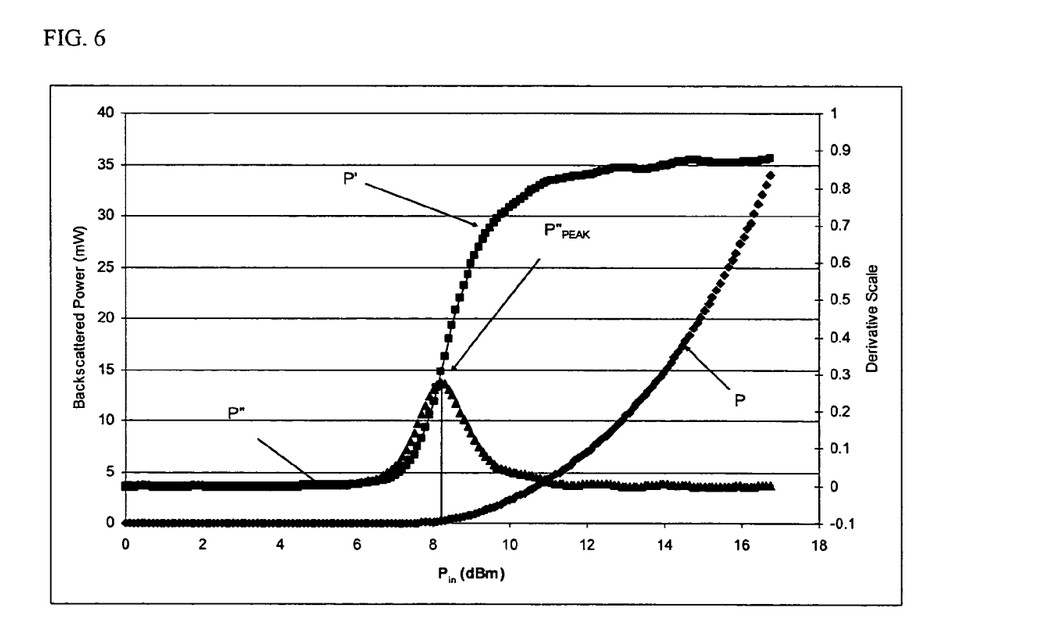
FIG. 6 is a plot of backscattered power versus input power, and its first and second derivatives for a representative optical fiber SBS threshold measurement.

When the scans are completed, first and second derivatives of the curve are calculated. The data set are preferably smoothed prior to calculating the first and second derivatives. The absolute SBS threshold is herein defined at the point at which the second derivative is maximum. An illustrative plot of measured data (curve P) and the first and second derivatives (curve P' and P'', respectively) are presented in FIG. 6. Curve P' is then the first derivative of backscattered power in mW with respect to input power in mW. Curve P'' is the second derivative of backscattered power in mW with respect to input power in mW. In FIG. 6, the abscissa of the peak $P''_{PEAK}$ of curve P'' is the absolute SBS threshold, SBSt, in dBm (e.g. 8.22 dBm in FIG. 6). That is, the input power at which the second derivative is a maximum is defined as the absolute SBS threshold for the fiber.

As reported herein, SBS threshold values were obtained with a polarization control device that establishes a fixed polarization state. However, in an alternate embodiment of the system and/or method for measuring SBS threshold, the SBS threshold could also be measured with a polarization randomizer or scrambler. The use of a polarization randomizer would increase the measured SBSt values for a given optical fiber by approximately a factor of 1.5 [see M. O. van Deventer and A. J. Boot, J. Lightwave Technology, vol. 12, pp. 585–590 (1994)] when compared to the SBSt value obtained with a fixed polarization state (100% degree of polarization and constant state of polarization).

Comparative SBS threshold values reported herein, such as SBS threshold improvement over a representative SMF-28™ optical fiber manufactured by Corning Incorporated which has an attenuation similar to the attenuation of the optical fibers disclosed herein, compare the SBS threshold of different fibers of the same length measured in the same way (i.e. by the same method, and measurement system if measurement data is used). Thus, even though various SBS threshold measurement methods (and systems) may exist, the comparative values obtained from two different fibers according to the same method should be substantially similar to comparative values obtained from those fibers utilizing a different method.

The SBS threshold varies with the length and attenuation of the fiber under test. Generally, a very short length of an optical fiber will tend to have a higher SBS threshold value than a very long length of the same fiber. Also, generally, a length of one optical fiber having a higher attenuation will tend to have a higher SBS threshold value than the same length of another similar optical fiber having a lower attenuation. An approximate analytical expression is given in "Raman and Brillouin Non-Linearities in Broadband WDM-Overlay Single Fiber PONs," G. H. BuAbbud et al., ECOC 2003.

$$P_{th}(L) \approx 21 \frac{\alpha A_{\it eff}}{g_B^{\it eff}[1 - \exp(-\alpha L)]},$$

where $g_B^{\it eff}$ is the effective Brillouin gain coefficient, $\alpha$ is the attenuation, L is the fiber length, $A_{\it eff}$ is the optical effective area. In this simple approximation, the SBS threshold is inversely proportion to the effective length of the fiber. Thus, if the measured threshold for a length $L_1$ is $P_1$, then the threshold at length $L_2$ is $$P_2 \text{ (dB)} \cong P_1 \text{ (dB)} + 10 \log\left[\frac{1 - \exp(-\alpha L_1)}{1 - \exp(-\alpha L_2)}\right].$$

For example, the values of SBS threshold reported herein correspond to fibers having a length ($L_1$) of about 50 km and an attenuation at 1550 nm of about 0.19 dB/km. Thus, the SBS threshold $P_2$ for an optical fiber of the type disclosed herein having a length $L_2$ and attenuation $\alpha_2$ can be determined from:

$$P_2(\text{dB}) \cong P_1(\text{dB}) + 10 \log\left[\frac{1 - \exp(-(0.19*50.5/4.343))}{1 - \exp(-\alpha L_2)}\right].$$

Preferably, the optical fiber disclosed herein has a silica-based core and cladding. In preferred embodiments, the cladding has an outer diameter of about 125 μm. Preferably, the outer diameter of the cladding has a constant diameter along the length of the optical fiber. In preferred embodiments, the refractive index of the optical fiber has radial symmetry.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
   a length;
   a core having a refractive index profile and a centerline, the core refractive index profile comprising a first central segment and a second segment surrounding and adjacent to the first central segment, wherein the relative refractive index of the second segment is less than that of the first segment, and
   a cladding layer surrounding and directly adjacent the core;
   wherein the optical fiber has an attenuation at 1550 nm;
   wherein the refractive index of the core is selected to provide:
   an optical effective area at 1550 nm no less than 80 µm²;
   a zero dispersion wavelength less than about 1450 nm;
   a dispersion at 1550 nm greater than 10 ps/nm-km; and
   an absolute SBS threshold in dBm greater than about $10 + 10 \log [(1-e^{-(0.19)(50)/4.343})/(1-e^{-(\alpha)(L)/4.343})]$, wherein L is the length in km and $\alpha$ is the attenuation at 1550 nm.

2. The optical fiber of claim 1 wherein the optical effective area is less than 120 µm².

3. The optical fiber of claim 1 wherein the optical effective area is between about 90 and 110 µm².

4. The optical fiber of claim 1 wherein the absolute SBS threshold in dBm is greater than about $11 + 10 \log [(1-e^{-(0.19)(50)/4.343})/(1-e^{-(\alpha)(L)/4.343})]$.

5. The optical fiber of claim 1 wherein the absolute SBS threshold in dBm is greater than about $12 + 10 \log [(1e^{-(0.19)(50)/4.343})/(1e^{-(\alpha)(L)/4.343})]$.

6. The optical fiber of claim 1 wherein the dispersion at 1550 nm is greater than about 12 ps/nm-km.

7. The optical fiber of claim 1 wherein a zero dispersion wavelength is less than about 1400 nm.

8. The optical fiber of claim 1 wherein the acousto-optic effective area, $AOEA_{L01}$, of the $L^{01}$ acoustical mode is not less than 200 µm² at the Brillouin frequency of the optical fiber.

9. The optical fiber of claim 1 wherein the acousto-optic effective area, $AOEA_{L02}$, of the $L_{02}$ acoustical mode is not less than 200 µm² at the Brillouin frequency of the optical fiber.

10. The optical fiber of claim 1 wherein the core comprises a central segment, and an annular segment adjacent and contacting the central segment, wherein the entire core has a positive relative refractive index.

11. The optical fiber of claim 1 wherein the core comprises a maximum relative refractive index greater than 0.75%.

12. An optical fiber comprising:
    a length;
    a core having a refractive index profile and a centerline, the core refractive index profile comprising a first central segment and a second segment which surrounding and adjacent to the first central segment, wherein the relative refractive index of the second segment is less than that of the first segment; and
    a cladding layer surrounding and directly adjacent the core;
    wherein the optical fiber has an attenuation at 1550 nm;
    wherein the refractive index of the core is selected to provide:
    an optical effective area at 1550 nm greater than 80 µm²;
    a zero dispersion wavelength less than 1450 nm; and
    an absolute SBS threshold in dBm greater than about $10 + 10 \log [(1-e^{-(0.19)(50)/4.343})/(1-e^{-(\alpha)(L)/4.343})]$, wherein L is the length in km and $\alpha$ is the attenuation at 1550 nm.

13. The optical fiber of claim 1, wherein the zero dispersion wavelength is greater than about 1350.

14. The optical fiber of claim 12, wherein the zero dispersion wavelength is greater than about 1350.

* * * * *